(12) United States Patent
Klein et al.

(10) Patent No.: US 10,193,849 B2
(45) Date of Patent: *Jan. 29, 2019

(54) DETERMINING STORIES OF INTEREST BASED ON QUALITY OF UNCONNECTED CONTENT

(71) Applicant: Facebook, Inc., Menlo Park, CA (US)

(72) Inventors: Gregory Joseph Klein, Seattle, WA (US); Bradley Ray Green, Snohomish, WA (US); Jun Li, Sammamish, WA (US); Jonathan Daniel Sorg, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,804

(22) Filed: Jun. 28, 2017

(65) Prior Publication Data

US 2017/0302614 A1   Oct. 19, 2017

Related U.S. Application Data

(63) Continuation of application No. 14/307,331, filed on Jun. 17, 2014, now Pat. No. 9,712,578.

(51) Int. Cl.
*G06F 15/16* (2006.01)
*H04L 12/58* (2006.01)
(Continued)

(52) U.S. Cl.
CPC .............. *H04L 51/32* (2013.01); *G06F 17/30* (2013.01); *G06F 17/3053* (2013.01);
(Continued)

(58) Field of Classification Search
CPC ...................................................... H04L 51/32
See application file for complete search history.

(56) References Cited

U.S. PATENT DOCUMENTS 8,965,970 B2    2/2015  Cathcart et al.
2011/0313757 A1*  12/2011  Hoover ................. G06F 17/274
                                                    704/9
(Continued)

OTHER PUBLICATIONS

United States Office Action, U.S. Appl. No. 14/307,331, dated Jul. 21, 2016, 24 pages.

(Continued)

*Primary Examiner* — Vivek Srivastava
*Assistant Examiner* — Nicholas P Celani
(74) *Attorney, Agent, or Firm* — Fenwick & West LLP (57) ABSTRACT

A system identifies unconnected content items of high quality and provides the unconnected content items for display to a user. The method comprises receiving several content items posted on pages of a social networking system. The system then determines a subset of those content items (e.g., high quality content items). A topic is then extracted from each of the subset of content items. The topic is mapped to one or more related pages of the social networking system that represent an expanded set of pages associated with the content item. For each of the related pages, a user is identified who is connected to the related page. Finally, the content item (e.g., a high quality content item) is provided to the user for display in the user's newsfeed.

20 Claims, 4 Drawing Sheets

(51) Int. Cl.
  *H04L 29/06* (2006.01)
  *H04L 29/08* (2006.01)
  *G06F 17/30* (2006.01)
  *G06Q 50/00* (2012.01)
  *G06N 99/00* (2010.01)

(52) U.S. Cl.
  CPC ........... *G06N 99/005* (2013.01); *G06Q 50/01* (2013.01); *H04L 51/063* (2013.01); *H04L 65/403* (2013.01); *H04L 67/306* (2013.01)

(56) References Cited

U.S. PATENT DOCUMENTS

| | | |
|---|---|---|
| 2012/0079034 A1 | 3/2012 | Farrell et al. |
| 2012/0166532 A1 | 6/2012 | Juan et al. |
| 2012/0296991 A1 | 11/2012 | Spivack et al. |
| 2012/0331063 A1 | 12/2012 | Rajaram |
| 2013/0124624 A1 | 5/2013 | Cathcart et al. |
| 2013/0124625 A1 | 5/2013 | Cathcart et al. |
| 2013/0124626 A1 | 5/2013 | Cathcart et al. |
| 2014/0081977 A1* | 3/2014 | Kapur ................ G06Q 30/0269 707/738 |
| 2014/0156360 A1 | 6/2014 | Shalita et al. |
| 2014/0156566 A1 | 6/2014 | Kabiljo et al. |
| 2014/0156744 A1 | 6/2014 | Hua et al. |

OTHER PUBLICATIONS

United States Office Action, U.S. Appl. No. 14/307,331, dated Jan. 5, 2016, 22 pages.

* cited by examiner

DETERMINING STORIES OF INTEREST BASED ON QUALITY OF UNCONNECTED CONTENT

CROSS REFERENCE TO RELATED APPLICATIONS

This application is a continuation of co-pending U.S. application Ser. No. 14/307,331, filed Jun. 17, 2014, which is incorporated by reference in its entirety.

BACKGROUND

This invention relates generally to the selection of content for presentation to a user of a social networking system.

A user of the social networking system may like or follow a page in which he is interested, in order to receive updates in his newsfeed when the page posts new content. For example, if a user is a fan of a particular public figure, he might choose to fan a page of a public figure, and as posts are made on that public figure page, the user can receive updates about those posts. Other pages that are related to the followed page may exist on the social networking system. The user may not be aware of the other pages but may still be interested in receiving updates from the other pages because the posted content from the other pages is relevant to the followed page. For example, there might be other pages that have regular posts about the public figure, and the user may not be connected to these other pages, but might be interested in following them if he was aware of these pages. Therefore, a method is needed to identify content related to a user's interest and to provide the related content to the user.

SUMMARY

A method is described for identifying unconnected content items of high quality and providing the unconnected content items for display to a user. The method comprises receiving a several content items posted on pages of a social networking system. The content items may be status updates, posts, photos, or other content posted on a page, such as a user profile page, a business page, a public figure page, a group page, or an organization page. The content items may be posted within the social networking system or may be cross-posts made on another social networking system or other site that also provides the posted content within the social networking system. A processor then determines a subset of the content items. The subset of content items can be determined as high quality content items. A high quality content item is a content item that provides useful, relevant, or informative information. For example, a poorly written and meaningless status update or a post considered as spam would not be considered to be a high quality content item. The quality of a content item may be determined by performing a lexical analysis on the content item and determining the number of spelling and grammatical errors. The quality score of the content item may be inversely proportional to the number of errors the content item contains. A topic is then extracted from each of the high quality content items. The processor then maps the topic to one or more related pages of the social networking system that represent an expanded set of pages associated with the high quality content item. For each of the related pages, a user is identified that is connected to the related page. Finally, the high quality content item is provided to the user for display in the user's newsfeed.

As one example, if a user has liked a public figure's fan page, the user might be interested in receiving high quality posts from other pages that post information about the public figure, such as from a general news page posting the latest news about the public figure. A general news page though may not be connected to the public figure's fan page in the social networking system. Posts from that page may not be available on the fan page since some of the posts may be about less favorable news for the public figure that the fan page is unlikely to share. Yet, the user may wish to have access to all of this content. The social networking system can provide these unconnected stories of interest by identifying high quality content items (e.g., the posts about the public figure on the news page), mapping topics from these posts to related pages (e.g., mapping to the public figure's fan page or to a meta page associated with the fan page), and identifying users who have liked those related pages (e.g., liked the public figure fan page) to whom it can provide the high quality news page posts about the public figure. Though the user is not connected to the news page, he can receive high quality posts about the public figure from that page and others due to his connection to the public figure's fan page.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
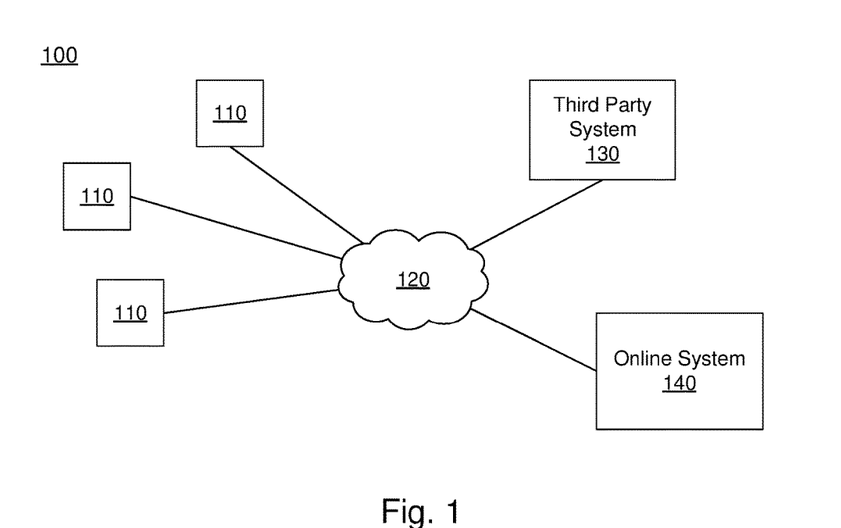
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
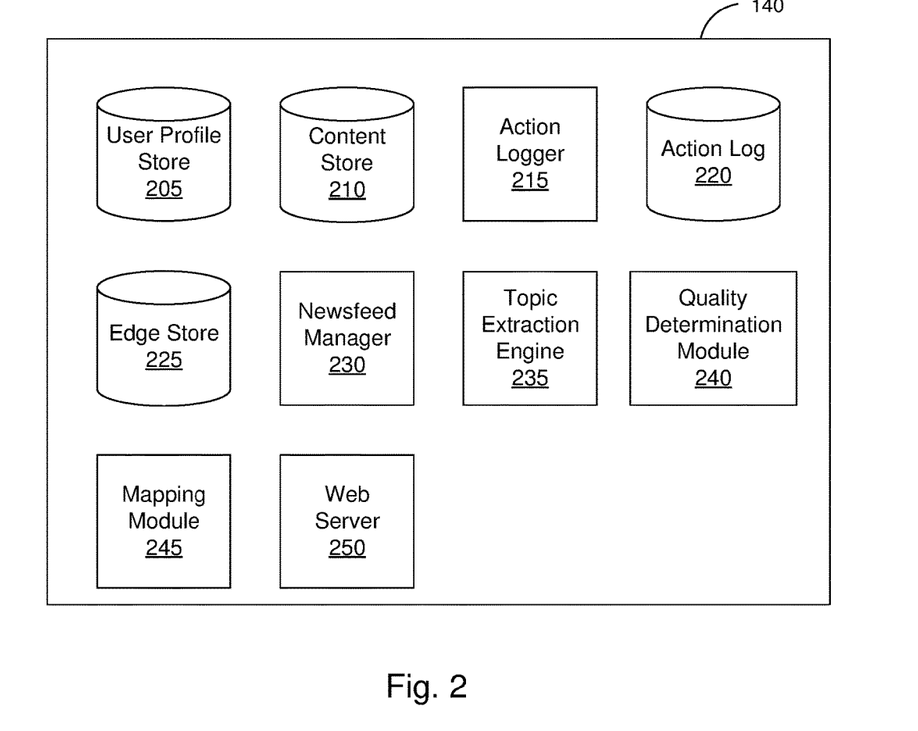
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, a newsfeed manager 230, a topic extraction engine 235, a mapping module 240, a quality module 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in edge store 225 or may select candidate stories included in content store 210. One or more of the candidate stories are selected and presented to a user by the newsfeed manager 230.

For example, the newsfeed manager 230 receives a request to present one or more stories to a social networking system user. The newsfeed manager 230 accesses one or more of the user profile store 105, the content store 110, the action log 120, and the edge store 130 to retrieve information about the identified user. For example, stories or other data associated with users connected to the identified user are retrieved. The retrieved stories or other data is analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 230. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, newsfeed manager 210 may analyze stories received by social networking system 120 from various users and obtains information about user preferences or actions from the analyzed stories. This information may be used to refine subsequent selection of stories for newsfeeds presented to various users.

The social networking system 140 includes a topic extraction engine 235, which identifies one or more topics associated with objects in the content store 110. To identify topics associated with content items, the topic extraction engine 235 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 235 determines one or more topics associated with a content item maintained in the content store 110. The one or more topics associated with a content item are stored and associated with an object identifier corresponding to the content item. In various embodiments, associations between object identifiers and topics are stored in the topic extraction engine 235 or in the content store 110 to simplify retrieval of one or more topics associated with an object identifier or retrieval of object identifiers associated with a specified topic. Structured information associated with a content item may also be used to extract a topic associated with the content item.

The social networking system 140 includes a quality determination module 240. Some pages of the social networking system 140 may generate content items that are low quality and do not provide substantial or interesting information to users. Other pages on the social networking system 140 may generate content items that are high quality and provide interesting information for users. The quality determination module 240 uses a variety of methods to determine the quality of a content item posted by a page in a social networking system 140. In some embodiments, the quality determination module 240 performs lexical or semantic analysis on a content item to determine whether the content item is high quality. The quality determination module 240 may also take into account characteristics such as whether the content item is trending, whether the content item contains spam, or whether the content item contains calls to action. The quality determination module 240 identifies content items of high quality to present to unconnected users, as further described below with reference to FIG. 4 and FIG. 5.

The social networking system 140 includes a mapping module 245 to identify content items which may be of interest to users. A user of the social networking system 140 may "like" or follow a page because he is interested in the content posted by the page. However, the social networking system 140 may contain other pages that also relate to and post similar content that the user is not aware of, and therefore has not liked, followed, fanned, established a connection with, joined an event or group associated with, created an event for, engaged in a transaction associated with (either on the social networking system or outside of the social networking system on an external system), authorized or used an application regarding, expressed a preference for, shared, commented on, or otherwise taken an action that indicates the user's intent to receive content from the page or entity associated with the page. The mapping module 245 uses a variety of methods to identify and group pages with related content. In some embodiments, the mapping module 245 utilizes a topic extracted from each page by the topic extraction engine 235. In other embodiments, the mapping module 245 uses co-interaction statistics or other methods to identify related pages. In some embodiments, the quality determination module 240 and mapping module 245 may be the same entity.

The web server 250 links the social networking system 140 via the network 120 to the one or more client devices 110, as well as to the one or more third party systems 130. The web server 140 serves web pages, as well as other web-related content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Determining Unconnected Stories of Interest

Figure 3:
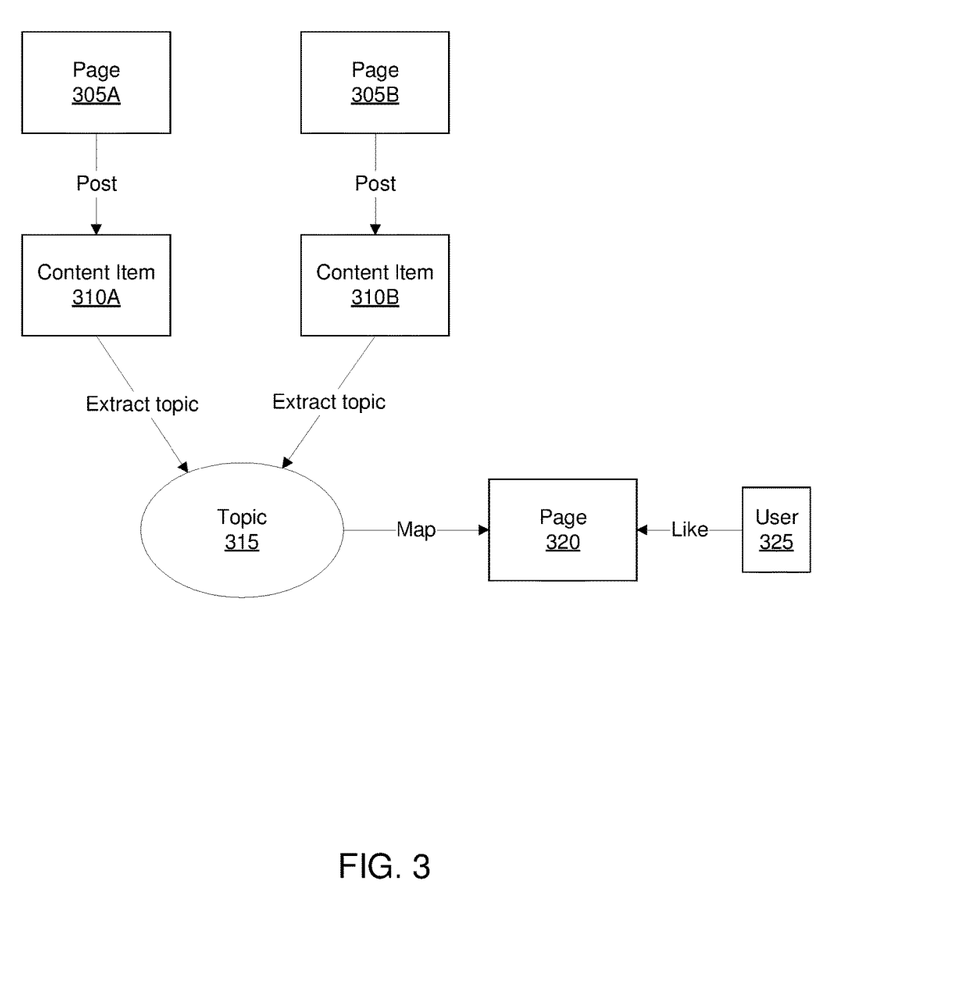
FIG. 3 is a block diagram representing the relationships between pages, content items, and users of a social networking system, in accordance with an embodiment of the invention.

FIG. 3 is an example block diagram depicting the content association relationships between pages, content items, and users of the social networking system 140. The social networking system 140 may contain a plurality of pages 305. A page in the social networking system 140 may be a profile page of a user, a page associated with a business or organization, or any other page type as described above with reference to FIG. 2. Although only two pages 305A and 305B are shown, it is noted that the social networking system 140 may contain any number of pages 305, and that only two are shown in FIG. 3 for the sake of simplicity. Each page 305 posts one or more content items D10. A content item 310 may be a status update, a photo, a shared link, or any other content item type as described above with reference to FIG. 2. A topic 315 is then extracted from each content item 310 by the topic extraction engine 235. Though FIG. 3 depicts a single topic 315 being extracted from each content item D10, multiple topics 315 may be extracted from each content item 310 in other embodiments. Additionally, although the content items 310 share a similar topic 315 in FIG. 3, it is likely that in other embodiments, multiple content items 310 may not share a single topic 315, thus resulting in a plurality of topics 315. In some embodiments, the quality determination module 240 may have already selected the pages 305 and content items 310 depicted in FIG. 3 as being pages and content items of high quality. Therefore, content items 310 may be high quality content items. The mapping module 245 may then map the topic 315 to a related page 320 which a user 325 has liked or followed, as further described below with reference to FIG. 4 and FIG. 5. The user 325 may be providing input through a client device 110 as described above with reference to FIG. 1. Mapping the topic to a related page can include mapping to a meta page associated with the related page. A meta page is a page that includes certain meta data about the page. Meta-pages are also described in U.S. patent application Ser. No. 13/295,000, filed on Nov. 11, 2011, U.S. patent application Ser. No. 13/294,998, filed on Nov. 11, 2011, and U.S. patent application Ser. No. 13/295,001, filed on Nov. 11, 2011, which are incorporated by reference in their entireties. The newsfeed manager 230 may then decide to present the content items 310 to the user 325. FIG. 3 depicts how an unconnected content item 310 may be identified to present to a user 325, even though the user 325 is not directly connected to the page 305 producing the content item D10.

Mapping of content within a social networking system may be performed in topic space. Semantic and lexical analysis is performed over a corpus of articles in an encyclopedia or other knowledge database. The content is then tokenized into grams, and each gram is mapped to a distribution of related articles in the knowledge database. The distributions for each gram of a content or topic are combined, producing a mapping of content in topic space. In some embodiments, the knowledge database may be an online encyclopedia, such as Wikipedia.

Content within a social networking may be mapped in page space by performing audience modeling. A set of fans engaging with a set of content is identified. The high quality content from the set of content are identified, as further described below with reference to FIG. 4. The high quality content is tabulated with multiplicity and importance statistics are then calculated of the tabulations, producing a vector description of the content in page space. In some embodiments, content in the social networking system may be mapped to an associated article in an encyclopedia, such as Wikipedia. This process is called meta-page clustering, which is also described in U.S. patent application Ser. No. 13/295,000, filed on Nov. 11, 2011, U.S. patent application Ser. No. 13/294,998, filed on Nov. 11, 2011, and U.S. patent application Ser. No. 13/295,001, filed on Nov. 11, 2011, which are incorporated by reference in their entireties. Mapping the vector description of content in page space through meta-page clustering provides a description of content in topic space.

The social networking system may also model users based on the pages they fan and the content they consume. The pages a user fans may be indicative of location, demographic, and other descriptive features related to the user's taste. For example, a user may like a page associated with a coffee shop in a particular neighborhood. Based on this fanning of a page, the social networking system may determine that the user currently resides in or near the particular neighborhood. The content a user consumes is also tracked and is measured in a process called topic interaction history. The social networking system identifies and records the topics associated with each page or content item with which a user interacts. The history of topics associated with a user may be indicative of the user's interests and preferences. This user interest modeling can then be used as a factor in determining what topics may be of interest to a given user and thus what content items or stories might be of interest to the user.

Figure 4:
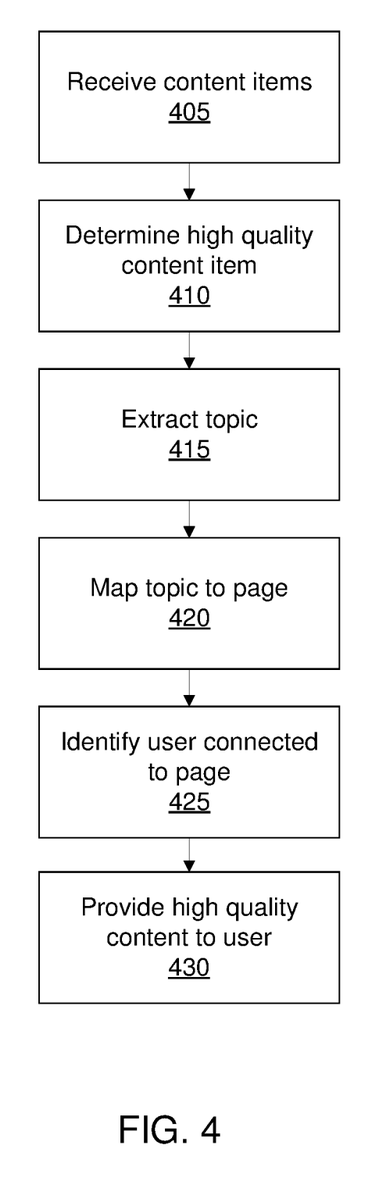
FIG. 4 is a flow chart illustrating the method for determining a story of interest to present to a user, in accordance with an embodiment of the invention.

FIG. 4 illustrates an example flowchart of a method for identifying stories of interest for presentation in a user's newsfeed. The social networking system 140 receives 405 a plurality of content items. These content items may be status updates, shared photos, or a variety of other content item types as described above with reference to FIG. 2, and may be posted by a page representing an individual, business, group, or other entity.

The quality determination module 240 then determines which of the received content items are high quality content items 410. A content item may be deemed to be of high quality if the information presented in the content item is informative, relevant, or well organized. For example, a post on a user's profile page with a link to a news article and a well-written summary may be considered to be a high quality content item, while a poorly written and meaningless status update may not be considered to be a high quality content item. In one example, a content item is deemed high quality if it has more than threshold number of positive indicators of quality as determined by the quality determination module 240. The quality determination module 240 may use a variety of methods to determine whether a content item is of high quality. In some embodiments, the quality determination module 240 may use machine learning trained classifiers that rely on the discovery and measurement of features of the content items and content items producers. In some embodiments, the content item producers are the pages which post the content item, such as an individual user's profile page that posts a status update.

One example of a classifier that the quality detection module 240 may use is user behavior. The quality detection module 240 may measure and compare user behavior for organically provided content items versus shared content items. A content item is organically viewed if users of the social networking system 140 viewed the content item directly in their newsfeed or on the originating page. A content item is shared if users of the social networking system 140 viewed the content item because the content item was shared by another entity, such as another user or another page. User behavior may include click-through rate, comment-through rate, re-share rate, and hide rate. Click-through rate is the number of users who click on a link posted by a content provider. Comment-through rate is the number of users who comment on a content item posted by a content provider. Re-share rate is the number of users who share a content item posted by a content provider. Hide rate is the number of users who hide a content item from the user's newsfeed. Often times, if the measured user behavior for a shared view of a content item is within a threshold value of measured user behavior for organic views of the same content item, the content item is likely to be high quality.

The quality determination module 240 may also take into consideration the history of a content producer as a classifier. If a page has historically produced consistently high quality content items, the quality determination module 240 may assume that any future posts from the page are also high quality content items. In some embodiments, the quality determination module may use a verification system that tags certain content providers as being high quality content producers. The quality determination module 240 may also consider the reach and engagement rate of a content provider as useful classifiers. The reach of a content provider is the number of users who have a non-zero chance of seeing a content item from the content provider in their newsfeed. The engagement rate of a content provider is the number of users who are predicted to interact with a content item posted by the content provider. The quality determination module 240 may assume that a content provider with a high reach or a high engagement rate will provide high quality content items, because users are more likely to view and interact with high quality content items.

The quality determination module 240 may also perform lexical and semantic analysis on a content item to determine whether the content item is of high quality. Performing lexical analysis on a content item may reveal spelling correctness, grammatical correctness, and vocabulary choice of the content item. A content item that has correct spelling and grammar and uses sophisticated vocabulary may be assumed to be a high quality content item, since the content item producer likely put forth a large amount of effort in producing the content item. On the other hand, a content item that has spelling and grammar mistakes and uses simple vocabulary may be considered to be a low quality content item, since the content item producer likely did not put forth a large amount of effort to produce the content item. For example, a quality score calculated for a content item may be inversely proportional to the number of spelling and grammar errors the content item contains. Performing semantic analysis on a content item may reveal the subject matter covered by the content item. If a content item discusses one coherent subject matter throughout, the content item may be considered to be of high quality. However, if the content item discusses several diffuse subject matters throughout, the content item may be considered to be of low quality, because the content item is not organized and structured effectively. For example, the quality score calculated for a content item may be inversely proportional to the number of diffuse subject matters discussed in the content item.

The quality determination module 240 may also look at the trending status of a content item as a classifier. A content item may be considered to be trending if the content item has received above a threshold number of views, shares, or interactions from users. In other words, a content item is trending if the content item is receiving a much higher distribution and engagement rate than what would be predicted by the content provider's past history. A trending content item may be considered a high quality content item. However, some content providers may engage in a practice known as feed gaming. Feed gaming content refers to content items which explicitly ask users to like, share, or otherwise promote the content item. Content items with feed gaming content may skew classifiers such as the trending classifier, because the content provider is artificially boosting the content item's reach and engagement rate. Therefore, the quality determination module 240 may use lexical analysis of the content item to detect feed gaming content. A content item with feed gaming content may be prevented from being classified as a high quality content item. The quality detection module 240 may identify spam and meme content as classifiers, as well. Spam and meme content is content that is not novel or particularly meaningful to users. Spam content may be advertisements disguised as genuine appeals for help. Meme content can be banal or hackneyed images, often accompanied by text. Multiple classification processes can be used to detect spam and meme content; identification by user behavior, identification by user reporting, identification by content hashing, and identification by user operations. A content item that contains either spam or meme content may be classified as a low quality content item.

Referring back to FIG. 4, the quality determination module 240 then extracts a topic 415 from each of the identified high quality content items. In some embodiments, the topic extraction may be performed by the topic extraction engine 235. In some embodiments, the topic extraction engine 235 and the quality determination module 240 may be the same entity. The content item may be analyzed for key terms and phrases associated with common topics. The method used to extract a topic from a content item is further described above with reference to FIG. 2.

The mapping module 245 then maps the extracted topic to a related page 420 (which can include mapping to a meta page associated with the related page 420). In some embodiments, the quality determination module 240 may perform the mapping. In some embodiments, the mapping module 245 and quality determination module 240 may be the same entity. The mapping module 245 may map the extracted topic to a related page 420 by determining that the related page or its meta page also contains the same topic. Referring to FIG. 3 as an example, the mapping module 245 may determine that the page 320 contains the same topic 315 as the high quality content item 310A. Referring back to FIG. 4, the mapping module 245 may also map a topic to a related page 420 by identifying URL's related to the topic 315 and the related page 320. A topic 315 may be associated with a URL because the content items 310 or content providers 305 from which the topic was extracted shared the URL. In turn, the related page 320 may be associated with a URL because the related page 320 shared the URL by posting a content item. If the topic 315 and the related page 320 are associated with the same URL, the mapping module 245 may map the topic 315 to the related page 320. In some embodiments, the URL is canonicalized by mapping the URL to an authoritative domain and receiving a simpler representation based on the content of the URL. This enables the mapping module 245 to associate different variations of the same URL.

The mapping module 245 may also map 420 the extracted topic 315 to the related page 320 or meta page using hierarchical agglomerative clustering. The lexical distance is calculated between content items 310 from which the topic 315 was extracted and the related page 320. If the lexical distance is short enough, the mapping module 245 may determine that the related page 320 also contains the topic 315, and may map the topic 315 to the related page 320. The mapping module 245 may also measure co-production of hashtags. A hashtag is a segment of text with which a content provider can mark or tag its content items. If a topic 315 is heavily associated with a hashtag, and the related page 320 also produces content items with the same hashtag, the mapping module 245 maps the topic 315 to the related page 320. Finally, the mapping module 245 may also measure co-interaction rates between the content items 310 from which the topic 315 was extracted and the related page 320. If the same users of the social networking system 140 interact with both the content items 310 and the related page 320, the mapping module 245 may determine that the content items 310 and the related page 320 share the same topic 315, and map the topic 315 to the related page 320.

The mapping module 245 then identifies a user who is connected to the related page 425. Referring to FIG. 3, a user 325 may be connected to the related page 320 because the user 325 liked or followed the related page 320. In other embodiments, the user 325 may be connected to the related page 320 via a different mechanism. Referring back to FIG. 4, the mapping module 245 then provides the high quality content item for display to the user 430. The user identified by the mapping module 245 is the target audience for the high quality content items. In some embodiments, the mapping module 245 may transmit the high quality content item to the newsfeed manager 230, and the newsfeed manager 230 may determine how to display the high quality content item in the user's newsfeed. In the method described above and depicted in FIG. 4, the social networking system 140 provided unconnected, but relevant, content items 310, or unconnected stories of interest, to a target user 325. In other words, the social networking system 140 is able to provide the user 325 with content items 310 from a page 305 that the user is interested in, but may not necessarily be connected to.

In some embodiments, the target audience for the high quality content item may be more than one step removed from the high quality content item. For example, referring back to the related page 320, it may be mapped to a second topic, and the second topic may be mapped to a second related page. The target audience might be a user who is connected to the second related page. This process is called page chaining and may be used by the mapping module 245 to extend the network of pages and topics that are mapped to one another, increasing the number of potential users to which the high quality content item can be provided.

In some embodiments, the high quality content item may be reviewed by an editorial review board prior to being transmitted to the newsfeed manager 230 to be displayed in a user's newsfeed. The editorial review board may be tasked with providing feedback on the quality of the content and the appropriateness of targeting. Along with providing an alternative measurement to providing people with good content, this editorial board may also provide training data for the machine learning processes described above with reference to FIG. 4.

Figure 5:
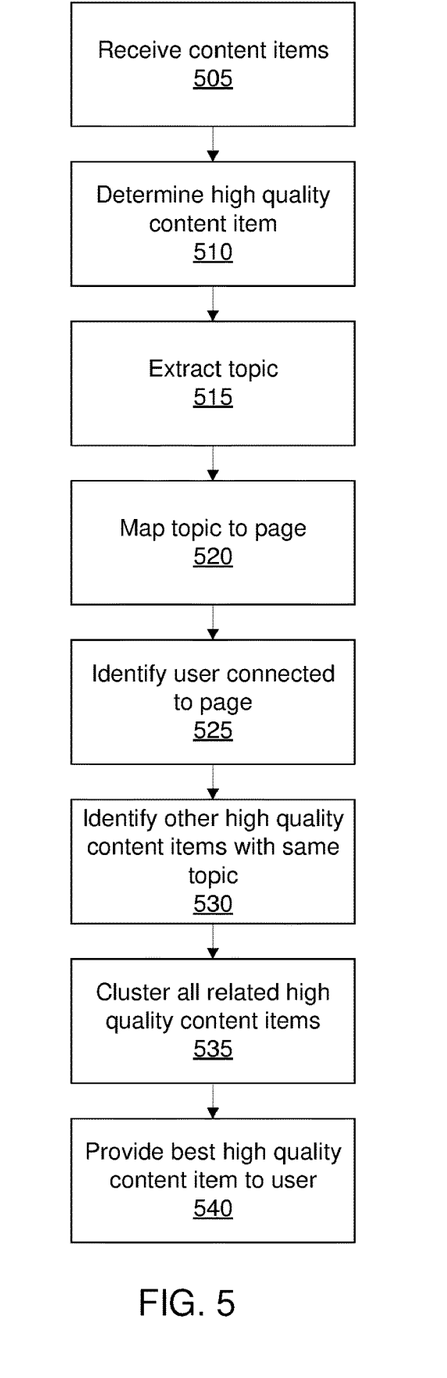
FIG. 5 is a flow chart illustrating the method for determining a story of interest to present to a user, in accordance with a different embodiment of the invention.

FIG. 5 illustrates an example flowchart of a different embodiment of a method for identifying stories of interest for presentation in a user's newsfeed. Steps 505-525 of the method depicted in FIG. 5 are similar to steps 405-425 of the method as described above with reference to FIG. 4. The quality determination module 240 receives 505 a plurality of content items 405. The quality determination module 240 determines 510 which of the plurality of received content items are high quality content items 410. The topic extraction engine 235 extracts 515 the topic from each of the high quality content items 415. The mapping module 245 maps 520 the extracted topic to a related page 420, and the mapping module identifies 525 a user who is connected to the related page 425. In the embodiment depicted in FIG. 5, the quality determination module 240 identifies 530 other high quality content items with the same topic 530. Referring to FIG. 3, the quality determination module 240 may identify a total of two quality content items 310A and 310B with the same topic 315. In other embodiments, the number of quality content items 310 may be greater than two. The mapping module 245 then groups or clusters together 535 the high quality content items 310 with the same topic 315, and then selects the best high quality content item 310 to provide 540 to the user. The mapping module 245 may select 540 the best high quality content item 310 from the cluster by using one or more of the machine learning classifiers described above with reference to FIG. 4. Selecting only one of the plurality of related high quality content items 310 to provide to the user prevents multiple repetitive content items from appearing in the user's newsfeed. For example, page 305A and 4305B may be news channel pages, and content items 310A and 310B may be news articles about the same current event. Instead of displaying two very similar news stories to the user 325, the method depicted in FIG. 5 allows the social networking system 140 to provide only one of the two news stories.

Multiple pages may be mapped together using a page chaining method. Page chaining may occur by mapping pages directly to other pages. For example, a page A may be mapped to a page B, and page B may be mapped to a page C, thus extending the expanded set of related pages on the social networking system. In some embodiments, a user who is connected to page C may be provided with a high quality content item posted by page A. Page chaining may also occur by mapping pages to topics, as described above with reference to FIGS. 4 and 5. For example, a page A may be mapped to a topic T1, and topic T1 may be mapped to a page B. Additionally, page B may be mapped to a topic T2, and topic T2 may be mapped to a page C. In some embodiments, T1 and T2 may be the same topic. In some embodiments, a user who is connected to page C may be provided with a high quality content item posted by page A.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

storing user profiles for users of the social networking system, each user profile comprising connections between one of the users and pages of social networking system, the connections representing interactions performed by the users on the pages of the social networking system;

receiving a plurality of content items posted on an additional page of the social networking system;

determining, by a processor, from the plurality of content items, a subset of content items determined to be high quality content items, the determination of the high quality content items comprising: computing a quality score representing a lexical quality for the content item;

extracting topics from the content items of the subset by analyzing terms and phrases of the content items of the subset;

selecting one of the content items of the subset having an extracted first topic;

mapping the extracted first topic to one or more related pages of the social networking system, the mapping comprising:

determining a first rate of interactions performed by additional users of the social networking system on the content item and additional rates of interactions performed by the additional users on the one or more related pages by accessing connections stored in the user profiles of the additional users of the social networking system; and comparing the first rate of interactions to each of the additional rates of interactions;

for one of the one or more related pages:

identifying a user of the social networking system that previously interacted with the related page and previously did not interact with the additional page by accessing the connections in a stored user profile for the user of the social networking system; and providing the content item in a newsfeed for display to the user.

2. The computer-implemented method of claim 1, wherein the lexical quality comprises one or more of spelling correctness, grammatical correctness, and vocabulary choice.

3. The computer-implemented method of claim 1, wherein determining the high quality content items further comprises performing a semantic analysis on each of the plurality of content items, the semantic analysis comprises computing a semantic quality score representing a semantic quality for each of the plurality of content items and selecting the subset of content items with semantic quality score above a threshold semantic quality score, the semantic quality score inversely related to a number of subject matter topics in the content item.

4. The computer-implemented method of claim 1, wherein determining the high quality content items further comprises:

for each content item in the plurality of content items posted on the additional page of the social networking system:

determining values of features of the content item; and applying the determined values of features of the content item as input to a machine learned classifier.

5. The computer-implemented method of claim 4 further comprising:

for each content item in the plurality of content items posted on the additional page of the social networking system:

determining values of features of a content item producer that posted the content item; and applying the determined features of the content item producer as input to the machine learned classifier.

6. The computer-implemented method of claim 1, wherein the determination of the high quality content items further comprises determining whether each of the plurality of content items is trending, wherein a content item is determined to be trending if the content item has an interaction rate higher than a threshold interaction rate.

7. The computer-implemented method of claim 1, wherein mapping the extracted first topic to one or more related pages further comprises:

identifying a hashtag associated with the extracted first topic, the hashtag comprising a segment of text;

identifying one or more related pages that have produced one or more content items with the hashtag; and associating the extracted first topic with the one or more related pages.

8. The computer-implemented method of claim 1, wherein mapping the extracted first topic to one or more related pages further comprises:

mapping the extracted first topic to a first related page;

identifying a second topic that the first related page is mapped to;

identifying a second related page that the second topic maps to; and mapping the extracted first topic to the second related page.

9. The computer-implemented method of claim 1, further comprising:

responsive to determining the subset of content items determined to be high quality content items, tagging one or more content providers that each posted a high quality content as a high quality content producer.

10. A non-transitory computer-readable medium comprising computer code that, when executed by a processor, causes the processor to:

store user profiles for users of the social networking system, each user profile comprising connections between one of the users and pages of social networking system, the connections representing interactions performed by the users on the pages of the social networking system;

receive a plurality of content items posted on an additional page of the social networking system;

determine, by a processor, from the plurality of content items, a subset of content items determined to be high quality content items, the determination of the high quality content items comprising: computing a quality score representing a lexical quality for the content item, extract topics from the content items of the subset by analyzing terms and phrases of the content items of the subset;

select one of the content items of the subset having an extracted first topic;

map the extracted first topic to one or more related pages of the social networking system, wherein the computer code that causes the processor to map the extracted first topic further comprises computer code that, when executed by the processor, causes the processor to:

determine a first rate of interactions performed by additional users of the social networking system on the content item and additional rates of interactions performed by the additional users on the one or more related pages by accessing connections stored in the user profiles of the additional users of the social networking system; and compare the first rate of interactions to each of the additional rates of interactions;

for one of the one or more related pages:
identify a user of the social networking system that previously interacted with the related page and previously did not interact with the additional page by accessing the connections in a stored user profile for the user of the social networking system; and
provide the content item in a newsfeed for display to the user.

11. The non-transitory computer-readable medium of claim 10, wherein the lexical quality comprises one or more of spelling correctness, grammatical correctness, and vocabulary choice.

12. The non-transitory computer-readable medium of claim 10, wherein the computer code to determine the subset of content items determined to be high quality content items further comprises computer code that, when executed by the processor, causes the processor to:
perform a semantic analysis on each of the plurality of content items, wherein the semantic analysis comprises computing a semantic quality score representing a semantic quality for each of the plurality of content items and selecting the subset of content items with semantic quality score above a threshold semantic quality score, the semantic quality score inversely related to a number of subject matter topics in the content item.

13. The non-transitory computer-readable medium of claim 10, wherein the computer code to determine the subset of content items determined to be high quality content items further comprises computer code that, when executed by the processor, causes the processor to:
for each content item in the plurality of content items posted on the additional page of the social networking system:
determine values of features of the content item; and
apply the determined values of features of the content item as input to a machine learned classifier.

14. The non-transitory computer-readable medium of claim 13 further comprising computer code that, when executed by the processor, causes the processor to:
for each content item in the plurality of content items posted on the additional page of the social networking system:
determine values of features of a content item producer that posted the content item; and
apply the determined features of the content item producer as input to the machine learned classifier.

15. The non-transitory computer-readable medium of claim 10, wherein the computer code to determine the subset of content items determined to be high quality content items further comprises computer code that, when executed by the processor, causes the processor to:
determine whether each of the plurality of content items is trending, wherein a content item is determined to be trending if the content item has an interaction rate higher than a threshold interaction rate.

16. The non-transitory computer-readable medium of claim 10, wherein the computer code to map the extracted first topic to one or more related pages further comprises computer code that, when executed by the processor, causes the processor to:
identify a hashtag associated with the extracted first topic, the hashtag comprising a segment of text;
identify one or more related pages that have produced one or more content items with the hashtag; and
associate the extracted first topic with the one or more related pages.

17. The non-transitory computer-readable medium of claim 10, wherein the computer code to map the extracted first topic to one or more related pages further comprises computer code that, when executed by the processor, causes the processor to:
map the extracted first topic to a first related page;
identify a second topic that the first related page is mapped to;
identify a second related page that the second topic maps to; and
map the extracted first topic to the second related page.

18. The non-transitory computer-readable medium of claim 10, further comprising computer code that, when executed by the processor, causes the processor to:
responsive to the determination of the subset of content items determined to be high quality content items, tag one or more content providers that each posted a high quality content as a high quality content producer.

19. The method of claim 1, wherein selecting one of the content items of the subset having the extracted first topic comprises:
clustering content items of the subset, the cluster comprising content items that each have a common extracted first topic; and
selecting the content item from the cluster by applying a machine learning classifier that analyzes user behavior associated with the content items in the cluster.

20. The non-transitory computer-readable medium of claim 10, wherein the computer code that causes the processor to select one of the content items of the subset having the extracted first topic further comprises computer code that, when executed by the processor, causes the processor to:
cluster content items of the subset, the cluster comprising content items that each have a common extracted first topic; and
select the content item from the cluster by applying a machine learning classifier that analyzes user behavior associated with the content items in the cluster.

* * * * *

UNITED STATES PATENT AND TRADEMARK OFFICE
CERTIFICATE OF CORRECTION

PATENT NO. : 10,193,849 B2
APPLICATION NO. : 15/635804
DATED : January 29, 2019
INVENTOR(S) : Gregory Joseph Klein et al.

Page 1 of 1

It is certified that error appears in the above-identified patent and that said Letters Patent is hereby corrected as shown below:

In the Claims

Column 15, Claim 1, Line 4, delete "pages of social networking system" and insert -- pages of the social networking system --.

Column 15, Claim 3, Line 7, delete "with semantic quality score" and insert -- with a semantic quality score --.

Column 16, Claim 10, Line 6, delete "pages of social networking system" and insert -- pages of the social networking system --.

Column 17, Claim 12, Lines 10 & 11, delete "with semantic quality score" and insert -- with a semantic quality score --.

Signed and Sealed this
Twenty-third Day of July, 2019

Andrei Iancu
*Director of the United States Patent and Trademark Office*